(12) United States Patent
Shibata

(10) Patent No.: US 8,520,269 B2
(45) Date of Patent: Aug. 27, 2013

(54) IMAGE READING APPARATUS AND IMAGE FORMING APPARATUS PROVIDED WITH THE SAME

(75) Inventor: Naoki Shibata, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 312 days.

(21) Appl. No.: 13/093,194

(22) Filed: Apr. 25, 2011

(65) Prior Publication Data
US 2011/0267660 A1 Nov. 3, 2011

(30) Foreign Application Priority Data
Apr. 28, 2010 (JP) .................................. 2010-103004

(51) Int. Cl.
| | |
|---|---|
| H04N 1/04 | (2006.01) |
| H04N 1/00 | (2006.01) |
| H04N 1/40 | (2006.01) |
| B41J 25/308 | (2006.01) |
| B41J 29/38 | (2006.01) |
| B41L 19/00 | (2006.01) |
| G03G 15/02 | (2006.01) |
| G03G 15/30 | (2006.01) |
| G02B 26/08 | (2006.01) |
| G06K 9/40 | (2006.01) |

(52) U.S. Cl.
USPC ........... 358/474; 358/498; 358/487; 358/406; 358/461; 347/8; 347/16; 101/45; 399/116; 399/203; 359/196.1; 382/274

(58) Field of Classification Search
USPC ............... 358/474, 498; 347/8, 16; 101/45; 399/116, 203; 359/196.1; 382/274
See application file for complete search history.

(56) References Cited

U.S. PATENT DOCUMENTS

| | | | | |
|---|---|---|---|---|
| 3,826,190 | A | * | 7/1974 | Zofchak .......................... 101/45 |
| 4,646,162 | A | * | 2/1987 | Sue ................................ 358/498 |
| 4,660,957 | A | * | 4/1987 | Ueda et al. ..................... 399/203 |
| 4,804,993 | A | * | 2/1989 | Kenin et al. ................... 399/116 |
| 5,870,114 | A | * | 2/1999 | Numata et al. .................. 347/16 |
| 5,970,181 | A | * | 10/1999 | Ohtsu ............................ 382/274 |
| 6,426,823 | B1 | * | 7/2002 | Hsiao et al. ................. 359/196.1 |
| 2009/0058895 | A1 | * | 3/2009 | Kida ................................. 347/8 |

FOREIGN PATENT DOCUMENTS

| | | |
|---|---|---|
| JP | 04-242234 | 8/1992 |
| JP | 2007-67911 | 3/2007 |

OTHER PUBLICATIONS

Notice of Reasons for Rejection issued to JP Application No. 2010-103004, mailed May 23, 2012.

* cited by examiner

Primary Examiner — Charlotte M Baker
Assistant Examiner — Rury Grisham
(74) Attorney, Agent, or Firm — Dilworth & Barrese, LLP.

(57) ABSTRACT

An image reading apparatus includes:
a pair of pulleys between which a belt is stretched, and a pin that rotatably supports a driving pulley, of the pair of pulleys;
a mount for fixing the pin;
a housing;
at least two first fastening parts, respectively including first bosses that extend vertically from a bottom portion of the housing and first fastening members that are inserted into the first bosses via the mount to fix the mount to the housing;
and a second fastening part disposed on an opposite side to, the first fastening parts with respect to the pin in the scanning direction, including a second boss that extends vertically from the bottom portion of the housing and has a different height from the first bosses and a second fastening member that is inserted into the second boss via the mount to fix the mount to the housing.

10 Claims, 7 Drawing Sheets

IMAGE READING APPARATUS AND IMAGE FORMING APPARATUS PROVIDED WITH THE SAME

This application is based on and claims the benefit of priority from Japanese Patent Application No. 2010-103004, filed on 28 Apr. 2010, the content of which is incorporated herein by reference.

BACKGROUND OF THE INVENTION

1. Field of the Invention

The present invention relates to an image reading apparatus that scans and reads an image of an original and an image forming apparatus provided with the same.

2. Related Art

An image forming apparatus such as a copy machine that forms an image on paper by xerography is provided with an image reading apparatus for optically reading an image of an original. The image reading apparatus is generally provided with an optical system carriage including a light source, a mirror and the like. The image reading apparatus is configured to move the optical system carriage in a sub-scanning direction in a housing, which is a box-shaped structure, so as to read the image of the original by an image sensor such as CCD converting the image into an electric signal.

A driving unit that moves the optical system carriage includes one employing a belt drive system. Such a driving unit is configured to include a belt that moves the optical system carriage in the sub-scanning direction, a pair of pulleys between which the belt is stretched, a pin that rotatably supports a first pulley, which is a driving pulley, of the pair of pulleys, and a driving motor that rotationally drives the driving pulley.

Here, a stepping motor that can provide positioning by open loop control is often used as the driving motor. A driving device is proposed that is configured to prevent vibration of such a stepping motor from being transmitted, which decreases image quality, by forming a timing belt with a material of high elasticity and attaching the stepping motor to a frame via an antivibration member.

In the above prior art configuration, pins that support pulleys may fall due to tension of the timing belt and cause disalignment of pulleys. In addition, as the stepping motor is attached to the frame via the antivibration member made of an elastic body, alignment of the pulleys may be deteriorated by elastic deformation of the antivibration member. Such deterioration of alignment applies lateral pressure to the timing belt, thereby causing color shift in a color image forming apparatus.

SUMMARY OF THE INVENTION

An objective of the present invention is to provide an image reading apparatus that can read an original in high degree of accuracy by maintaining appropriate alignment of pulleys in a simple configuration.

In addition, another objective of the present invention is to provide an image forming apparatus that can stably obtain a high-quality image, including the abovementioned image reading apparatus.

The present invention relates to an image reading apparatus including: an optical system carriage that scans an original placed on a platen back and forth;

a driving unit including a belt that moves the optical system carriage in a scanning direction, a pair of pulleys around which the belt is stretched, a pin that rotatably supports a first pulley, which is a driving pulley, of the pair of pulleys, and a driving motor that rotationally drives the driving pulley;

a mount for fixing the pin;

a housing that houses the optical system carriage and the driving unit;

at least two first fastening parts for fastening and fixing the mount to the housing, respectively including first bosses that extend vertically from a bottom portion of the housing and first fastening members that are inserted into the first bosses via the mount to fix the mount to the housing;

and a second fastening part for fastening and fixing the mount to the housing that is spaced apart from, and disposed on an opposite side to, the first fastening parts with respect to the pin in the scanning direction, including a second boss that extends vertically from the bottom portion of the housing and has a different height from the first bosses and a second fastening member that is inserted into the second boss via the mount to fix the mount to the housing.

The present invention also relates to an image forming apparatus including an image reading apparatus including:

an optical system carriage that scans an original placed on a platen back and forth;

a driving unit including a belt that moves the optical system carriage in a scanning direction, a pair of pulleys around which the belt is stretched, a pin that rotatably supports a first pulley, which is a driving pulley, of the pair of pulleys, and a driving motor that rotationally drives the driving pulley;

a mount for fixing the pin;

a housing that houses the optical system carriage and the driving unit;

at least two first fastening parts for fastening and fixing the mount to the housing, respectively including first bosses that extend vertically from a bottom portion of the housing and first fastening members that are inserted into the first bosses via the mount to fix the mount to the housing;

and a second fastening part for fastening and fixing the mount to the housing that is spaced apart from, and disposed on an opposite side to, the first fastening parts with respect to the pin in the scanning direction, including a second boss that extends vertically from the bottom portion of the housing and has a different height from the first bosses and a second fastening member that is inserted into the second boss via the mount to fix the mount to the housing.

DETAILED DESCRIPTION OF THE INVENTION

Embodiments of the present invention are described hereinafter with reference to the attached drawings.

Image Forming Apparatus

Figure 1:
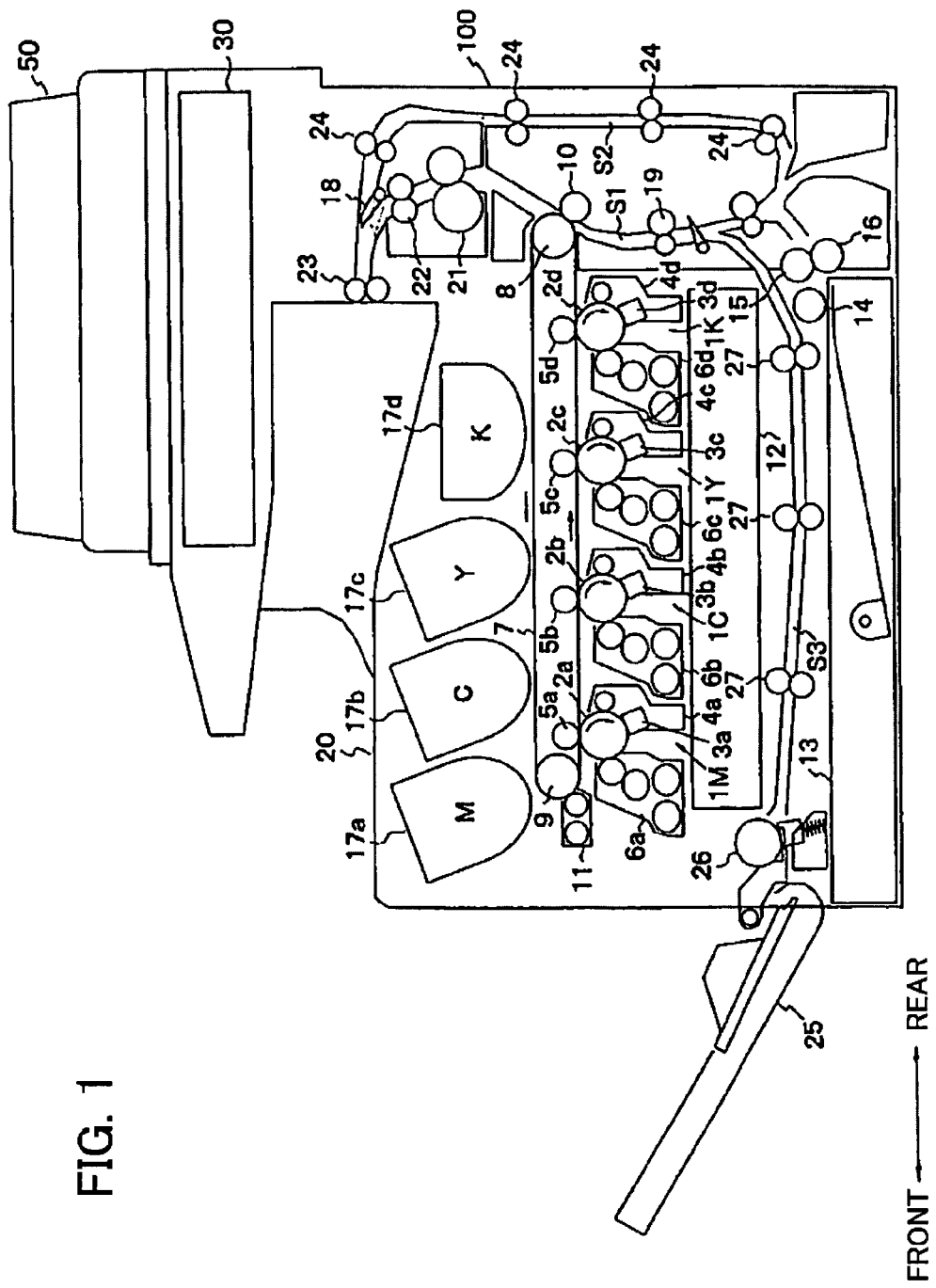
FIG. 1 is a cross-sectional side view of an image forming apparatus (color image forming apparatus) according to the present invention.

FIG. 1 is a cross-sectional view of a color image forming apparatus according to the present invention; the color image forming apparatus shown in the drawing is a color multi-functional peripheral having a copy function, a printer function, and a facsimile function. The color image forming apparatus includes a rectangular box-shaped apparatus main body 100 and an image reading apparatus 30 that is disposed in an upper portion of the apparatus main body 100. An automatic document feeder (ADF) 50 is disposed above the image reading apparatus 30. In addition, an ejected paper tray 20 that is open frontward (toward a left side of FIG. 1) is provided between the apparatus main body 100 and the image reading device 30.

Next, an internal structure of the apparatus main body 100 is described.

In a central portion inside an apparatus main body 100, a magenta image forming unit 1M, a cyan image forming unit 1C, a yellow image forming unit 1Y, and a black image forming unit 1K are arranged in tandem at constant intervals.

In the abovementioned image forming units 1M, 1C, 1Y and 1K, photoreceptor drums 2a, 2b, 2c, and 2d are respectively disposed. In a periphery of each of the photoreceptor drums 2a, 2b, 2c and 2d, charging devices 3a, 3b, 3c and 3d, developing devices 4a, 4b, 4c and 4d, transfer rollers 5a, 5b, 5c and 5d, and drum cleaning devices 6a, 6b, 6c and 6d are respectively disposed.

Here, the photoreceptor drums 2a, 2b, 2c and 2d are drum-like photoreceptors. The photoreceptor drums 2a, 2b, 2c and 2d are rotationally driven at a predetermined processing speed in a direction of an arrow shown (clockwise direction) by a drive motor (not shown). The charging devices 3a, 3b, 3c and 3d uniformly charge surfaces of the photoreceptor drums 2a, 2b, 2c and 2d at a predetermined potential by a charging voltage.

The developing devices 4a, 4b, 4c and 4d respectively store toners of magenta (M), cyan (C), yellow (Y) and black (K). The developing devices 4a, 4b, 4c and 4d each deposit toner of each color on an electrostatic latent image formed on each of the photoreceptor drums 2a, 2b, 2c and 2d, thereby visualizing the electrostatic latent image as a toner images of each color.

The primary transfer rollers 5a, 5b, 5c and 5d are disposed so as to be contactable to the photoreceptor drums 2a, 2b, 2c and 2d respectively in each primary transfer unit, via an intermediate transfer belt 7 as an intermediate transfer body.

The intermediate transfer belt 7 is disposed in a depth direction (in a horizontal direction in FIG. 1) to be stretched around a driving roller 8 on a rear side and a tension roller 9 on a front side. The photoreceptor drums 2a, 2b, 2c, and 2d are arranged in tandem along the depth direction (the horizontal direction in FIG. 1) below the intermediate transfer belt.

The driving roller 8 is disposed to be contactable to a secondary transfer roller 10 via the intermediate transfer belt 7 in a secondary transfer unit.

A belt cleaning device 11 is provided in the vicinity of the tension roller 9.

Furthermore, a laser scanner unit (LSU) 12 is disposed below the image forming units 1M, 1C, 1Y and 1K inside the apparatus main body 100. In a bottom portion of the apparatus main body 100, below the LSU 12, a paper feeding cassette 13 is detachably disposed.

A plurality of sheets of paper (not shown) is stacked and stored in the paper feeding cassette 13. In the vicinity of the paper feeding cassette 13, a pick-up roller 14 for picking up the paper from the paper feeding cassette 13, a feeding roller 15 and a retarding roller 16 for separating the paper thus picked up and feeding the paper to a paper path S1 sheet by sheet are provided.

Above the intermediate transfer belt 7 inside the apparatus main body 100, toner containers 17a, 17b, 17c and 17d that house toners of magenta, cyan, yellow and black to be supplied to the developing devices 4a, 4b, 4c and 4d are disposed along the depth direction (the horizontal direction in FIG. 1).

The paper path S1 is disposed substantially vertically on a rear side of the apparatus main body 100. Behind the paper path S1, another paper path S2 used for duplex printing is disposed substantially vertically. The paper paths S1 and S2 communicatively connect to each other on an upper side and a lower side thereof. In addition, in a communicative connection on the upper side of the paper paths S1 and S2, a flapper 18 is rotatably provided.

Here, a resist roller pair 19 is provided in the paper path S1 that retains temporarily the paper fed from the paper feeding cassette 13 and then feeds the paper to a secondary transfer portion, which is a contacting portion between the second transfer roller 10 and the intermediate transfer belt 7, at a predetermined timing. A fixing device 21, a feeding roller pair 22 and a paper ejection roller pair 23 are provided in a portion extending upward from the secondary transfer portion of the paper path S1 to the ejected paper tray 20. In the paper path S2 used for duplex printing, a plurality of reversing roller pairs 24 is provided at appropriate intervals.

A manual feeding tray 25 is provided in a front face of the apparatus main body 100 so as to be openable and closable. A paper path S3 extends substantially horizontally from the manual feeding tray 25 toward the rear side. An end of the paper path S3 joins the paper path S1. In the paper path S3, a dispatch roller 26 and a plurality of feed roller pairs 27 are provided.

An image forming operation by the color image forming apparatus thus configured is hereinafter described.

The following operation is initiated upon generation of an image formation start signal. An original is fed to the platen of the image reading device 30 by, for example, the automatic document feeder 50. The original thus fed is read by the image reading apparatus 30. Image data of the original thus read is stored in memory of the laser scanner unit 12.

Meanwhile, in each of the image forming units 1M, 1C, 1Y and 1K, each of the photoreceptor drums 2a, 2b, 2c and 2d are rotationally driven at a predetermined processing speed in a direction of the arrow shown (clockwise direction). The photoreceptor drums 2a, 2b, 2c and 2d are uniformly charged by the charging devices 3a, 3b, 3c and 3d.

The laser scanner unit 12 emits a laser beam that is modulated according to a color image signal of each color based on the image data stored in the memory. The laser scanner unit 12 irradiates a surface of each of the photoreceptor drums 2a, 2b, 2c and 2d with the laser beam, and forms an electrostatic latent image corresponding to the color image signal of each color on each of the photoreceptor drums 2a, 2b, 2c and 2d.

Thereafter, first, a magenta toner is deposited on an electrostatic latent image formed on the photoreceptor drum 2a of the magenta image forming unit 1M, by the developing device 4a to which a developing bias is applied, thereby visualizing the electrostatic latent image as a magenta toner image. In the primary transfer unit (transfer nip portion) between the photoreceptor drum 2a and the transfer roller 5a, the magenta toner image is primarily transferred onto the intermediate transfer belt 7 rotationally driven in the direction of the arrow shown, by an effect of the transfer roller 5a to which a primary transfer bias of an opposite polarity to that of the toner is applied.

The intermediate transfer belt 7, to which the magenta toner image is thus primarily transferred, is moved to the cyan image forming unit 1C. In the cyan image forming unit 1C, as in the abovementioned procedure, a cyan toner image formed on the photoreceptor drum 2b is transferred to overlap the magenta toner image on the intermediate transfer belt 7 in the primary transfer unit.

Similarly, in each primary transfer unit, yellow and black toner images formed on the photoreceptor drums 2c and 2d of the yellow and black image forming units 1Y and 1K are sequentially transferred to overlap the magenta and cyan toner images transferred and superimposed on the intermediate transfer belt 7, thereby forming a full-color toner image on the intermediate transfer belt 7. Residual toner that is not transferred to the intermediate transfer belt 7 and remains on the photoreceptor drums 2a, 2b, 2c and 2d is removed by the drum cleaning devices 6a, 6b, 6c and 6d. The photoreceptor drums 2a, 2b, 2c and 2d are thus prepared for the next image formation.

The paper dispatched from the paper feeding cassette 13 into the paper path S1 by the pick-up roller 14, the feeding roller 15 and the retarding roller 16 is fed to the secondary transfer unit by the resist roller pair 19, when a front end of the full-color toner image on the intermediate transfer belt 7 reaches the secondary transfer unit (transfer nip portion) between the intermediate transfer belt 7 and the secondary transfer roller 10. Afterwards, the full-color toner image is secondarily transferred collectively from the intermediate transfer belt 7 onto the paper conveyed to the secondary transfer unit, by the secondary transfer roller 10 to which a secondary transfer bias of an opposite polarity to that of the toner is applied.

The paper onto which the full-color toner image is transferred is fed to the fixing device 21. In the fixing device 21, the full-color toner image is fixed onto a surface of the paper by heating and pressurizing. The paper onto which the full-color toner image is fixed is then ejected from a rear side to a front side of the ejected paper tray 20 by the feeding roller pair 22 and the paper ejection roller pairs 23. A series of image forming operations is thus completed.

Residual toner that is not transferred to the paper and remains on the intermediate transfer belt 7 is removed by the belt cleaning device 11, thereby preparing the intermediate transfer belt 7 for the next image formation. In a case of single-side printing, the flapper 18 is positioned as shown by a solid line in FIG. 1.

The image forming operations in a case of cassette feeding have been described above. In a case of image formation by manual feeding, a user opens the manual feeding tray 25 as shown in FIG. 1 and feeds paper from the manual feeding tray thus opened. The paper is then dispatched to the paper path S3 by the dispatch roller 26; fed rearward on the paper path S3 to the paper path S1 by the plurality of feed roller pairs 27; and has an image formed on one side thereof by a process similar to that described above.

In a case of duplex printing, the flapper 18 is switched to a state shown by a dashed line in FIG. 1 immediately before that the paper, with an image formed on one side thereof by the abovementioned process, is ejected to the ejected paper tray 20, and the ejection roller pair 23 is reversed to switch back the paper to the paper path S2. The paper is then fed downward on the paper path S2 by the reversing roller pairs 24 to the paper path S1, and an image is formed on a reversed side of the paper by a process similar to that described above. The paper with images on both sides thereof is then ejected from a rear side to a front side of the ejected paper tray 20 by the paper ejection roller pairs 23. In this case, the flapper 18 is put back to the position shown by the solid line in FIG. 1.

Image Reading Apparatus

Next, an embodiment of the image reading device 300 according to the present invention is described hereinafter.

First Embodiment

Figure 2:
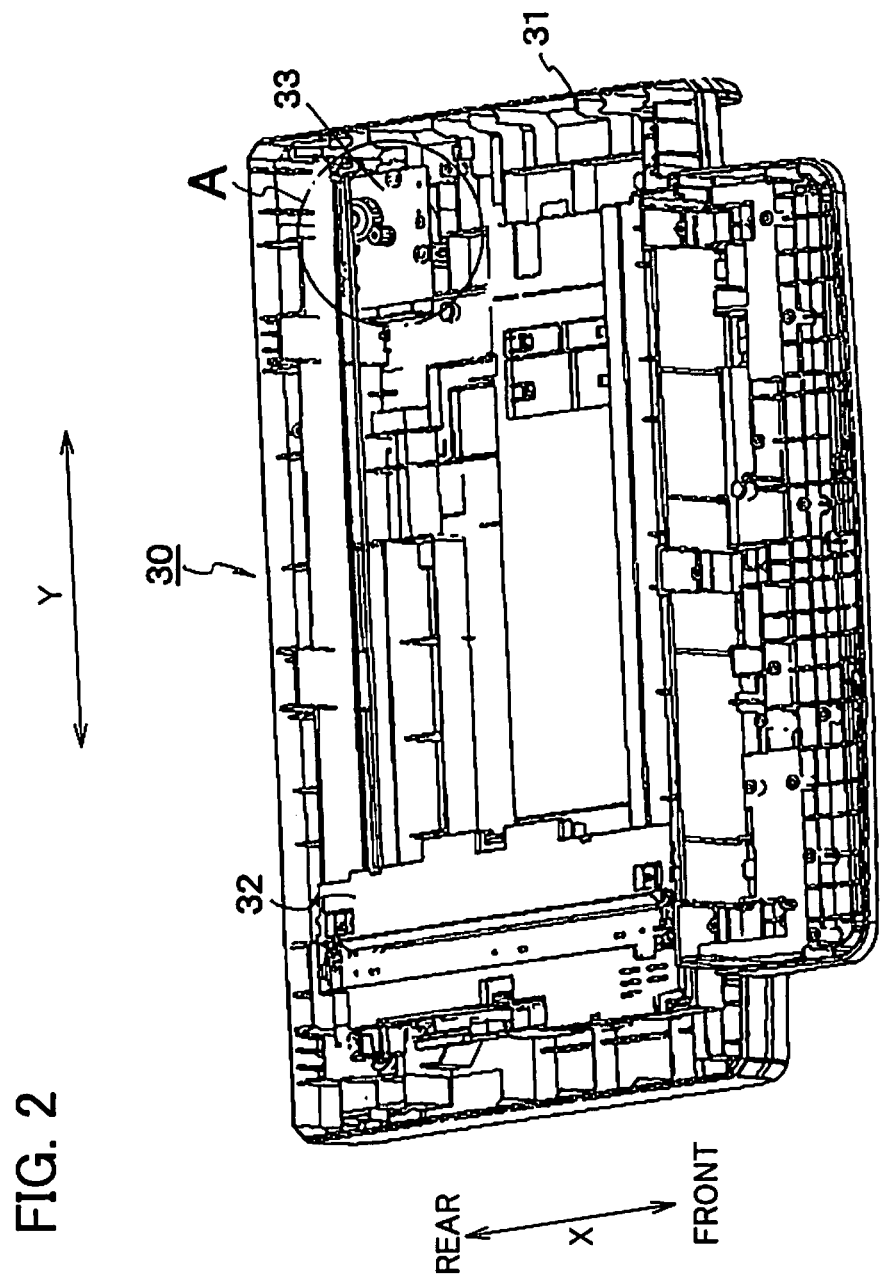
FIG. 2 is a perspective view showing a cover of the image forming apparatus according to a first embodiment of the present invention, removed.
Figure 3:
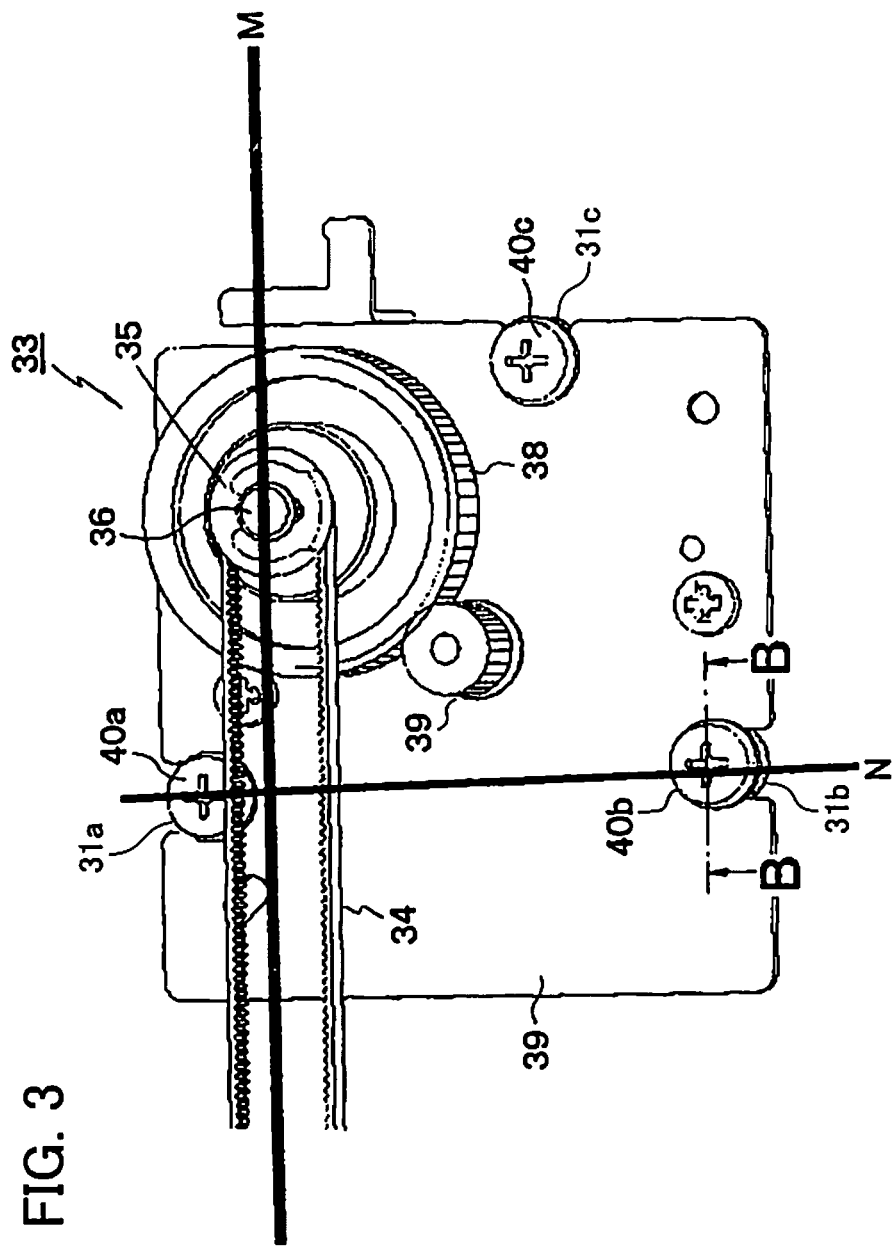
FIG. 3 is an enlarged detailed view of a portion A of FIG. 2.

FIG. 2 is a perspective view showing a cover of the image forming apparatus according to a first embodiment of the present invention, removed. FIG. 3 is an enlarged detailed view of a portion A of FIG. 2, FIG. 4 is a perspective view seen from a lateral side of FIG. 3, and FIG. 5 is a cross-sectional view taken along a line B-B of FIG. 3.

The image reading apparatus 30 includes a rectangular box-shaped housing (optical frame) 31. A platen (platen glass) (not illustrated) composed of transparent glass is fitted into an opening on an upper face of the housing 31.

An optical carriage 32 is housed inside the housing 31 so as to be movable back and forth in a sub-scanning direction (a horizontal direction in FIG. 2, direction Y, a stretching direction (described later)). The optical carriage 32 is formed in a rectangular block shape that is longer in a main scanning direction (direction X). The optical carriage 32 is moved inside the housing 31 in the sub-scanning direction by a driving unit 33 provided in a side part (right side part in FIG. 2) of the housing 31.

Figure 4:
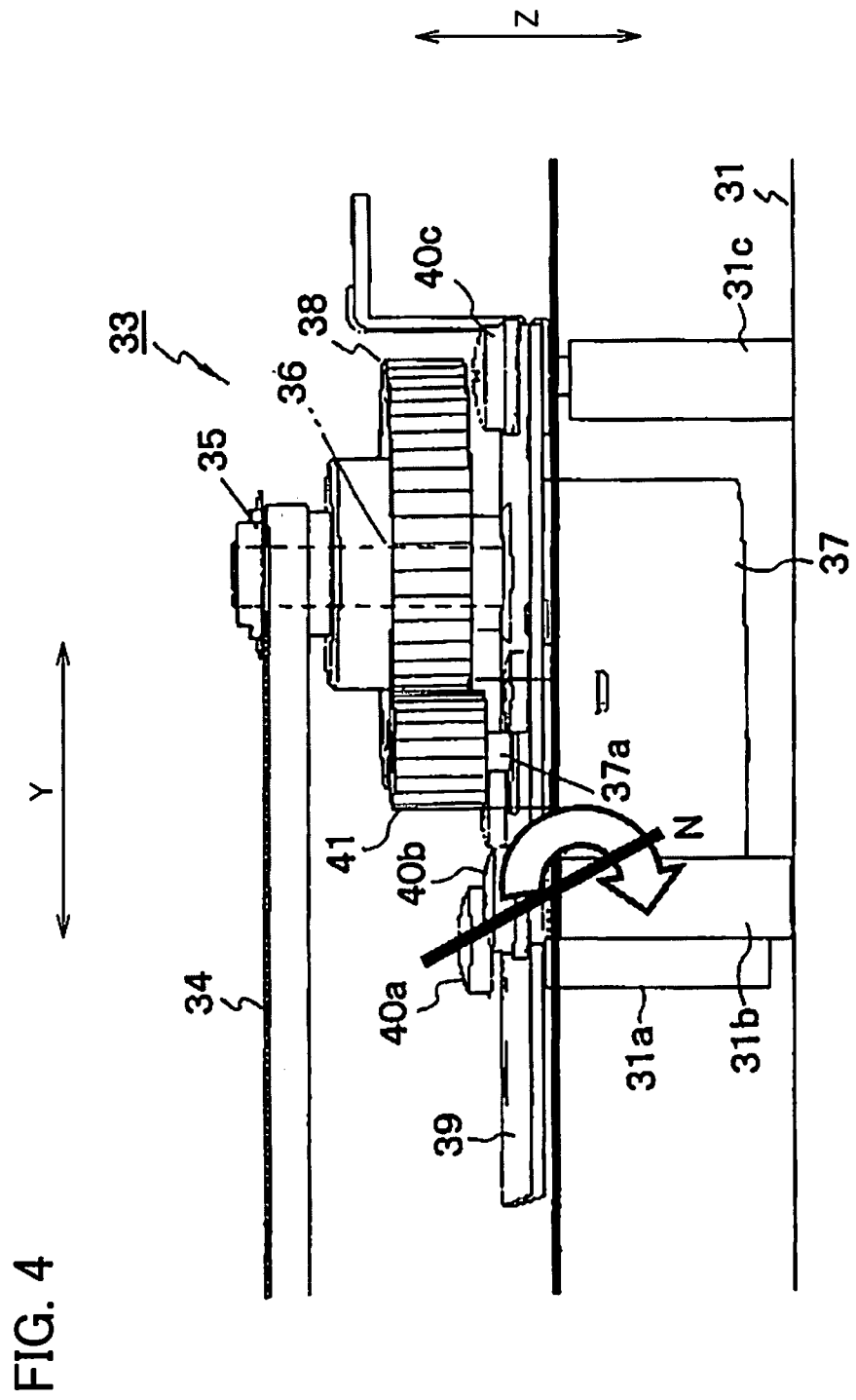
FIG. 4 is a perspective view seen from a lateral side of FIG. 3.
Figure 5:
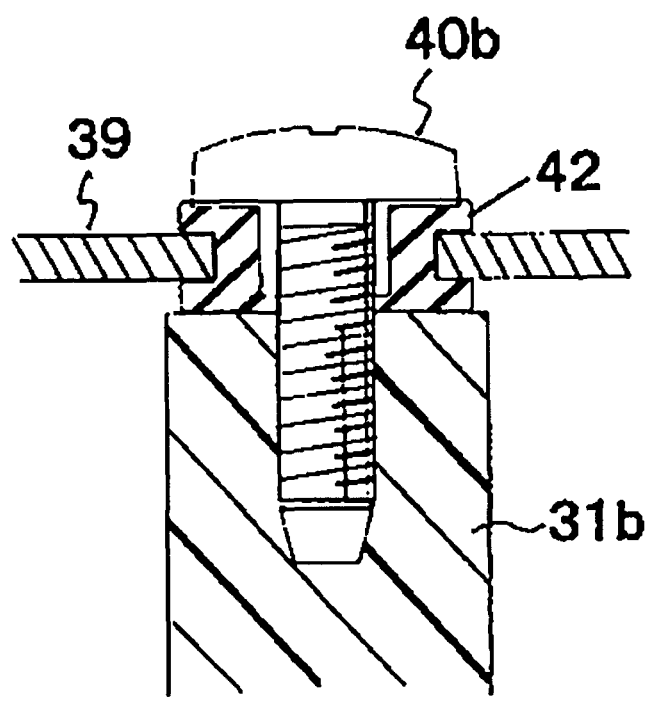
FIG. 5 is a cross-sectional view taken along a line B-B of FIG. 3.

Here, the driving unit 33 is configured to include an endless timing belt 34 that moves the optical system carriage 32 in the sub-scanning direction, a pair of pulleys (a first pulley, which is a driving pulley, is shown in FIGS. 3 and 4) between which the timing belt 34 is stretched, a pin 36 that rotatably supports the driving pulley 35, and a stepping motor 37 that rotationally drives the driving pulley 35.

The timing belt 34 is disposed to elongate in the sub-scanning direction (direction Y, the stretching direction), in a state of being stretched between a driven pulley (not illustrated) and the driving pulley 35 that are rotatably disposed on left and right sides in a rear part of the housing 31.

As shown in FIGS. 3 and 4, the driving pulley 35 is configured integrally with a large-diameter gear 38. The pin 36 standing upright (extending in direction Z) is inserted into the driving pulley 35 and the gear 38 that are integrated, and rotatably supported about the pin 36.

The pin 36 is disposed by a swage to stand upright on a mount 39 composed of a rectangular metal plate. The mount 39 is disposed and fixed to make a surface thereof horizontal, by three screws 40a, 40b and 40c screwed into three bosses 31a, 31b and 31c standing upright (formed to extend in direction Z) from a bottom surface of the housing 31.

As shown in FIG. 4, the stepping motor 37, which is a power source, is vertically attached to a bottom face of the mount 39 (such that an output shaft is in a vertical direction). The output shaft 37a extending from the stepping motor 37 penetrates the mount 39 and projects upward.

A small-diameter pinion 41 is fixed to an upper end of the output shaft 37a of the stepping motor 37, the pinion 41 engaging with the gear 38.

In the present embodiment, the mount 39 is attached to the housing 31 by two first fastening parts and a second fastening part. The mount 39 is attached to the housing 31 by the three screws 40a, 40b and 40c being screwed into the bosses 31a, 31b and 31c on the housing 31, through the mount 39.

In the present embodiment, the two first fastening parts are configured to include two first bosses 31a, 31b and two first screws (an example of first fastening members) 40a, 40b, respectively.

The two first fastening parts are configured to include the two first bosses 31a, 31b extending vertically from the bottom surface of the housing 31 and the two first screws 40a, 40b being screwed into the two first bosses 31a, 31b through the mount 39 thereby fixing the mount 39 to the housing 31, respectively.

As shown in FIG. 3, the two first fastening parts are arranged to be substantially orthogonal to an intercentral line M connecting centers of the driven pulley (not illustrated) and the driving pulley 35 and disposed on a timing belt side (a left side in FIG. 2) with respect to the pin 36 in the sub-scanning direction (scanning direction, direction Y, the stretching direction of the timing belt 34, may be hereinafter referred to as a horizontal direction).

In other words, as shown in FIG. 3, the two first bosses 31a, 31b are arranged to be substantially orthogonal to the intercentral line M connecting centers of the driven pulley (not illustrated) and the driving pulley 35 and disposed on the timing belt side with respect to the pin 36 in the sub-scanning direction (scanning direction, direction Y, the stretching direction of the timing belt 34).

In addition, as shown in FIG. 3, the two first screws 40a, 40b are arranged to be substantially orthogonal to the intercentral line M connecting centers of the driven pulley (not illustrated) and the driving pulley 35 and disposed on the timing belt side with respect to the pin 36 in the sub-scanning direction (scanning direction, direction Y, the stretching direction of the timing belt 34).

The second fastening part is configured to include a second boss 31c extending vertically from the bottom surface of the housing 31 and a second screw 40c (an example of the second fastening member) being screwed into the second boss 31c through the mount 39 thereby fixing the mount 39 to the housing 31.

As shown in FIG. 3, the second fastening part is disposed on an opposite side to the timing belt side with respect to the pin 36 in the sub-scanning direction (scanning direction, direction Y, the stretching direction of the timing belt 34, may be hereinafter referred to as a horizontal direction).

In other words, as shown in FIG. 3, the second boss 31c is disposed on an opposite side to the timing belt side with respect to the pin 36 in the sub-scanning direction (scanning direction, direction Y, the stretching direction of the timing belt 34).

In addition, as shown in FIG. 3, the second screw 40c is disposed on an opposite side to the timing belt side with respect to the pin 36 in the sub-scanning direction (scanning direction, direction Y, the stretching direction of the timing belt 34).

Incidentally, in the present embodiment, the mount 39 is fastened to the first boss 31b via an antivibration member 42 by the first screw 40b, as shown in FIG. 5. In other words, the first fastening part includes the antivibration member 42 disposed between the mount 39 and the first boss 31b.

Although FIG. 5 shows only the fastening part of the mount 39 by the first screw 40b, the mount 39 is fastened also in other fastening parts by the first and second screws 40a, 40c to the first and second bosses 31a, 31c, via the antivibration member 42.

In addition, in the present embodiment, a height of the second boss 31c in the second fastening part is set to be smaller than a height of the first bosses 31a, 31b in the first fastening part, as shown in FIG. 4.

When the stepping motor 37 is started, rotation of the output shaft 37a thereof is reduced by the pinion 41 and the gear 38 engaging with each other and transferred to the driving pulley 35, thereby rotationally driving the driving pulley 35 about the pin 36. As a result, the timing belt 34 is driven by the driving pulley 35, thereby moving the optical system carriage 32 in the sub-scanning direction. The original is optically read by scanning by the optical system carriage 32. By normal and reverse rotation of the stepping motor 37, the optical system carriage 32 is moved back and forth in the sub-scanning direction.

In the above operation, tension of the timing belt 34 is applied in a direction of bringing the pin 36 down. A force transferred to the mount 39 via the pin 36 generates a moment of bringing down the pin 36 centered in an intercentral line N (see FIG. 3) connecting centers of the first screws 40a, 40b (first fastening members) disposed in the first fastening parts. In the present embodiment, since the height of the second boss 31c in the second fastening part is set to be smaller than the height of the first bosses 31a, 31b in the first fastening part, as described above, a second fastening part side of the mount 39 can be made smaller than a first fastening part side thereof by adjusting an amount of fastening by the screw 40c. As a result, in the image reading device 30 of the present embodiment, the pin 36 can be prevented from falling by avoiding lifting of the second fastening part side (in other words, by counteracting the moment of bringing down the pin 36).

As the pin 36 is thus prevented from falling, superior and appropriate alignment is maintained between the driven pulley (not illustrated) and the driving pulley 35, and smooth driving of the timing belt 34 allows high-precision motion of the optical system carriage 32 exposing and scanning the original. As a result, the present embodiment can provide the image reading device 30 that can read the original with a high degree of accuracy in a simple configuration without needing an increased number of components.

In addition, as the mount 39 is fastened via the antivibration member 42 in the first and second fastening parts in the present embodiment, vibration of the stepping motor 37 is absorbed by the antivibration member 42. Vibration is suppressed by the antivibration member 42 from transferring to the optical system carriage 32. This allows high-accuracy reading of original image by the image reading apparatus 30.

As the image reading apparatus 30 thus reads the original with a high degree of accuracy, the color image forming apparatus shown in FIG. 1 including the image reading apparatus 30 can stably provide a high-quality image not suffering from color shift.

Second Embodiment

A second embodiment of the present invention is described hereinafter with reference to FIGS. 6 and 7.

Figure 6:
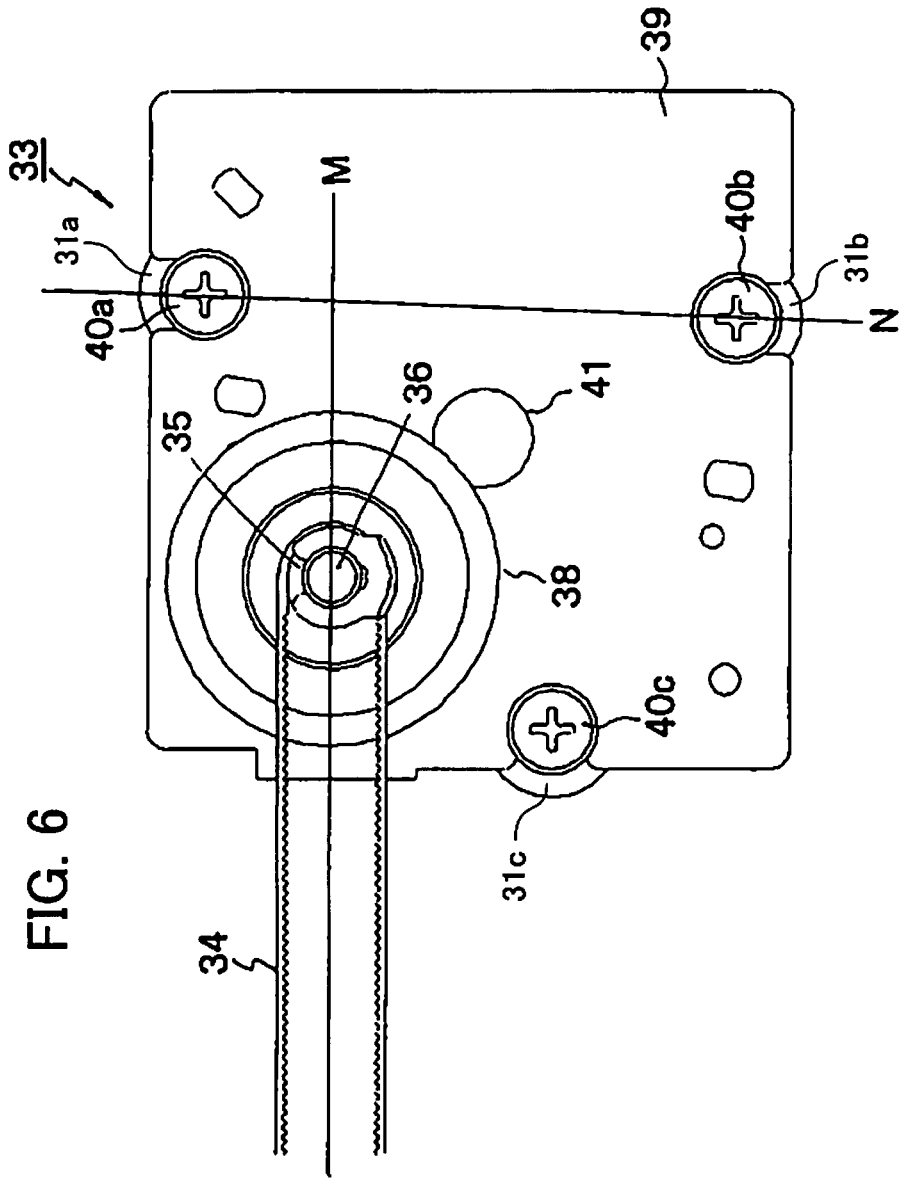
FIG. 6 is a plan view showing a driving unit of the image reading apparatus according to a second embodiment of the present invention.

FIG. 6 is a plan view showing a driving unit of the image reading apparatus according to a second embodiment of the present invention. FIG. 7 is a side view showing the driving unit. Similar components to those shown in FIGS. 2 to 5 are referred to by the same numerals and specific descriptions thereof are omitted.

In the present embodiment, arrangement of the first and second fastening parts that fasten the driving unit 33 to the mount 39 is reversed from that of the first embodiment.

As shown in FIG. 6, the two first fastening parts are arranged to be substantially orthogonal to an intercentral line M connecting centers of the driven pulley (not illustrated) and the driving pulley 35 and disposed on an opposite side to the timing belt side (a right side in FIG. 6) with respect to the pin 36 in the sub-scanning direction (scanning direction, direction Y, the stretching direction of the timing belt 34, may be hereinafter referred to as a horizontal direction).

As shown in FIG. 6, the second fastening part is disposed on the timing belt side with respect to the pin 36 in the sub-scanning direction (scanning direction, direction Y, the stretching direction of the timing belt 34, may be hereinafter referred to as a horizontal direction).

Figure 7:
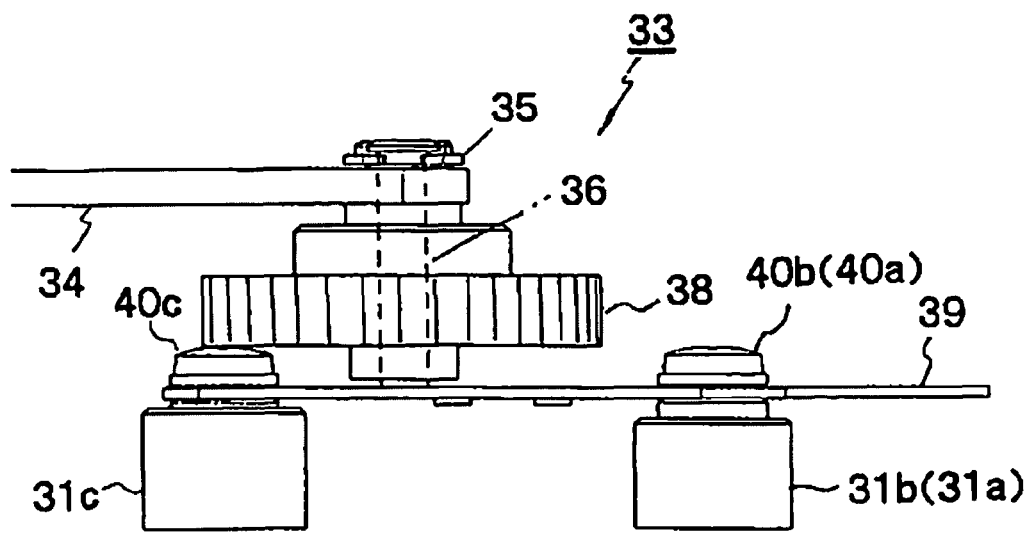
FIG. 7 is a side view showing a driving unit of the image reading apparatus according to the second embodiment of the present invention.

In addition, in the present embodiment, a height of the second boss 31c in the second fastening part is set to be greater than a height of the first bosses 31a, 31b in the first fastening part, as shown in FIG. 7.

Tension of the timing belt 34 is applied in a direction of bringing the pin 36 down. A force transferred to the mount 39 via the pin 36 generates a moment of bringing down the pin 36 centered in an intercentral line N (see FIG. 6) connecting centers of the first screws 40a, 40b disposed in the first fastening parts. However, in the present embodiment, since the height of the second boss 31c in the second fastening part is set to be greater than the height of the first bosses 31a, 31b in the first fastening part, as described above, a moment of a force applied vertically upward by the higher second boss 31b conteracts a moment of bringing down the pin 36. The pin 36 is thus prevented from falling.

As the pin 36 is thus prevented from falling, superior and appropriate alignment is maintained between the driven pulley (not illustrated) and the driving pulley 35, and smooth driving of the timing belt 34 allows high-precision motion of an optical system carriage (not illustrated) exposing and scanning the original. As a result, the present embodiment also can provide the image reading device 30 that can read the original with a high degree of accuracy in a simple configuration without needing an increased number of components.

In addition, also in the present embodiment, as the mount 39 is fastened via the antivibration member (not illustrated) in the first and second fastening parts as in the above embodiment, vibration of the stepping motor 37 is absorbed by the antivibration member (not illustrated). Vibration is suppressed by the antivibration member from transferring to the optical system carriage. This allows high-accuracy reading of original image by the image reading apparatus 30.

It should be noted that, although the above description shows the embodiment of the present invention applied to a color image forming apparatus and to an image reading apparatus provided therein, it is obvious that the present invention can be equally applied to other image forming apparatuses such as a color copy machine, a monochrome copy machine and the like, and an image reading apparatus provided therein.

What is claimed is:

1. An image reading apparatus comprising: an optical system carriage that scans an original placed on a platen back and forth;
a driving unit including a belt that moves the optical system carriage in a scanning direction, a pair of pulleys around which the belt is stretched, a pin that rotatably supports a first pulley, which is a driving pulley, of the pair of pulleys, and a driving motor that rotationally drives the driving pulley;
a mount for fixing the pin;
a housing that houses the optical system carriage and the driving unit;
at least two first fastening parts for fastening and fixing the mount to the housing, respectively including first bosses that extend vertically from a bottom portion of the housing and first fastening members that are inserted into the first bosses via the mount to fix the mount to the housing;
and a second fastening part for fastening and fixing the mount to the housing that is spaced apart from, and disposed on an opposite side to, the first fastening parts with respect to the pin in the scanning direction, including a second boss that extends vertically from the bottom portion of the housing and has a different height from the first bosses and a second fastening member that is inserted into the second boss via the mount to fix the mount to the housing.

2. The image reading apparatus according to claim 1, wherein one of the first boss and the second boss, which composes one of the first fastening part and the second fastening part that is disposed on an opposite side to a belt side with respect to the pin, is configured to be smaller in height than the other of the first boss and the second boss, which composes the other of the first fastening part and the second fastening part that is disposed on the belt side.

3. The image reading apparatus according to claim 2, wherein: the first fastening parts are disposed on the belt side;
the second fastening part is disposed on the opposite side to the belt side with respect to the pin in the scanning direction; and
the second boss composing the second fastening part is smaller in height than the first bosses composing the first fastening parts.

4. The image reading apparatus according to claim 2, wherein: the second fastening part is disposed on the belt side;
the first fastening parts are disposed on the opposite side to the belt side with respect to the pin in the scanning direction; and
the second boss composing the second fastening part is greater in height than the first bosses composing the first fastening parts.

5. The image reading apparatus according to claim 1, wherein at least one of the first fastening parts and the second fastening part is provided with an antivibration member between the mount and at least one of the first bosses and the second boss.

6. An image forming apparatus comprising
an image reading apparatus including: an optical system carriage that scans an original placed on a platen back and forth;
a driving unit including a belt that moves the optical system carriage in a scanning direction, a pair of pulleys around which the belt is stretched, a pin that rotatably supports a first pulley, which is a driving pulley, of the pair of pulleys, and a driving motor that rotationally drives the driving pulley;
a mount for fixing the pin;
a housing that houses the optical system carriage and the driving unit;
at least two first fastening parts for fastening and fixing the mount to the housing, respectively including first bosses that extend vertically from a bottom portion of the housing and first fastening members that are inserted into the first bosses via the mount to fix the mount to the housing;
and a second fastening part for fastening and fixing the mount to the housing that is spaced apart from, and disposed on an opposite side to, the first fastening parts with respect to the pin in the scanning direction, including a second boss that extends vertically from the bottom portion of the housing and has a different height from the first bosses and a second fastening member that is inserted into the second boss via the mount to fix the mount to the housing.

7. The image forming apparatus according to claim 6, wherein one of the first boss and the second boss, which composes one of the first fastening part and the second fastening part that is disposed on an opposite side to a belt side with respect to the pin, is configured to be smaller in height than the other of the first boss and the second boss, which composes the other of the first fastening part and the second fastening part that is disposed on the belt side.

8. The image forming apparatus according to claim 7, wherein: the first fastening parts are disposed on the belt side;
the second fastening part is disposed on the opposite side to the belt side with respect to the pin in the scanning direction; and
the second boss composing the second fastening part is smaller in height than the first bosses composing the first fastening parts.

9. The image forming apparatus according to claim 7, wherein: the second fastening part is disposed on the belt side;
the first fastening parts are disposed on the opposite side to the belt side with respect to the pin in the scanning direction; and
the second boss composing the second fastening part is greater in height than the first bosses composing the first fastening parts.

10. The image forming apparatus according to claim 6, wherein at least one of the first fastening parts and the second fastening part is provided with an antivibration member between the mount and at least one of the first bosses and the second boss.

* * * * *